(12) United States Patent
Gupta (10) Patent No.: US 11,556,912 B2
(45) Date of Patent: Jan. 17, 2023

(54) SMARTGLASSES-TO-SMARTGLASSES PAYMENT SYSTEMS

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 102 days.

(21) Appl. No.: 17/160,517

(22) Filed: Jan. 28, 2021

(65) Prior Publication Data

US 2022/0237584 A1    Jul. 28, 2022

(51) Int. Cl.
*G06Q 20/32* (2012.01)
*G06Q 20/40* (2012.01)
*G06Q 20/38* (2012.01)

(52) U.S. Cl.
CPC ......... *G06Q 20/321* (2020.05); *G06Q 20/325* (2013.01); *G06Q 20/3278* (2013.01); *G06Q 20/388* (2013.01); *G06Q 20/4012* (2013.01)

(58) Field of Classification Search
CPC ............... G06Q 20/321; G06Q 20/325; G06Q 20/3278; G06Q 20/388; G06Q 20/4012
USPC .......................................................... 705/44
See application file for complete search history.

(56) References Cited

U.S. PATENT DOCUMENTS

| | | | |
|---|---|---|---|
| 7,967,193 B1 | 6/2011 | McGinley et al. | |
| 9,870,716 B1 * | 1/2018 | Rao | G09B 19/0092 |
| 11,308,474 B1 * | 4/2022 | Gupta | G06Q 20/4097 |
| 11,386,424 B2 * | 7/2022 | Dicker | G06Q 20/3223 |
| 11,436,581 B1 * | 9/2022 | Walker | G07F 19/206 |

(Continued)

FOREIGN PATENT DOCUMENTS

| WO | WO-2015127225 A1 * | 8/2015 | ........... G06Q 20/321 |
|---|---|---|---|
| WO | WO-2016105892 A1 * | 6/2016 | ............... A61B 5/01 |

(Continued)

OTHER PUBLICATIONS

"Wearable Computers: State of the Art and Future Challenges," by Chengcheng Huang. 2015. (Year: 2015).*

(Continued)

*Primary Examiner* — Sara C Hamilton
(74) *Attorney, Agent, or Firm* — Weiss & Arons LLP (57) ABSTRACT

Methods for smartglasses-to-smartglasses payment systems is provided. Methods include receiving a transfer of funds initiation at a first smartglasses. The transfer of funds initiation may include an identifier, an amount and a personal identification number ("PIN"). Methods include transmitting the transfer of funds initiation from the first smartglasses to a second smartglasses. Methods may include receiving a notification on the second smartglasses. The notification may include a first smartglasses telephone number and the transfer of funds initiation. Methods may include transmitting a transfer of funds request from the second smartglasses to an entity. The transfer of funds request may include the first smartglasses telephone number, the transfer of funds initiation and the second smartglasses telephone number. Methods may include retrieving a first account and a second account from the entity. Methods may include transferring funds from the first account to the second account.

7 Claims, 5 Drawing Sheets

(56) References Cited

U.S. PATENT DOCUMENTS

| | | | |
|---|---|---|---|
| 2012/0310835 A1* | 12/2012 | Adams | G06Q 20/204 705/44 |
| 2014/0146178 A1 | 5/2014 | Kim et al. | |
| 2014/0349692 A1* | 11/2014 | Zhou | H04M 1/72439 455/466 |
| 2014/0368336 A1* | 12/2014 | Felix | G06Q 20/327 340/5.61 |
| 2015/0073907 A1 | 3/2015 | Purves et al. | |
| 2015/0081539 A1* | 3/2015 | Mizuno | G06Q 20/3674 705/41 |
| 2015/0178532 A1* | 6/2015 | Brule | G06Q 20/321 705/41 |
| 2015/0206045 A1* | 7/2015 | Gazdzinski | G04G 21/06 235/492 |
| 2015/0229750 A1* | 8/2015 | Zhou | H04M 1/72412 455/552.1 |
| 2015/0310412 A1* | 10/2015 | Calderon | G06Q 20/204 235/380 |
| 2015/0324181 A1 | 11/2015 | Segal | |
| 2015/0339696 A1* | 11/2015 | Zhou | G06Q 20/322 705/14.23 |
| 2016/0034887 A1* | 2/2016 | Lee | G09G 5/12 705/39 |
| 2016/0142866 A1* | 5/2016 | Jang | H02J 50/005 455/41.1 |
| 2016/0171487 A1* | 6/2016 | Deliwala | G06Q 20/385 705/41 |
| 2016/0275483 A1* | 9/2016 | Zhou | H04W 76/14 |
| 2016/0321742 A1* | 11/2016 | Phillips | G06Q 20/3274 |
| 2016/0364008 A1 | 12/2016 | Chun et al. | |
| 2016/0379205 A1* | 12/2016 | Margadoudakis | G06Q 20/327 705/71 |
| 2017/0004485 A1* | 1/2017 | Lee | G06Q 20/3226 |
| 2017/0076284 A1* | 3/2017 | Wu | H04B 1/385 |
| 2017/0103440 A1* | 4/2017 | Xing | H04W 12/06 |
| 2017/0116657 A1 | 4/2017 | Oh et al. | |
| 2017/0161720 A1* | 6/2017 | Xing | A61B 10/0051 |
| 2017/0293740 A1* | 10/2017 | Xing | A61B 5/7425 |
| 2017/0323285 A1* | 11/2017 | Xing | G06F 3/015 |
| 2018/0329209 A1 | 11/2018 | Nattukallingal | |
| 2019/0033622 A1* | 1/2019 | Olgun | H04B 1/385 |
| 2019/0053739 A1* | 2/2019 | Inoue | G06Q 40/02 |
| 2019/0075266 A1 | 3/2019 | Jeong et al. | |
| 2019/0279195 A1* | 9/2019 | Li | G06Q 20/3227 |
| 2019/0298173 A1 | 10/2019 | Lawrence et al. | |
| 2019/0377417 A1* | 12/2019 | Friedman | H04L 63/0861 |
| 2020/0350989 A1* | 11/2020 | Llewelyn | H04L 51/10 |
| 2021/0058758 A1* | 2/2021 | Carter | G06F 3/014 |
| 2021/0241256 A1* | 8/2021 | Caldwell | G06Q 20/3224 |
| 2021/0279700 A1 | 9/2021 | Simpson et al. | |
| 2021/0357897 A1 | 11/2021 | Phillips et al. | |
| 2022/0114327 A1 | 4/2022 | Faaborg et al. | |
| 2022/0237584 A1* | 7/2022 | Gupta | G06Q 20/325 |
| 2022/0253824 A1* | 8/2022 | Gupta | G06Q 20/3567 |

FOREIGN PATENT DOCUMENTS

| | | | | | |
|---|---|---|---|---|---|
| WO | WO-2018083663 A1 | * | 5/2018 | | G06K 19/06028 |
| WO | WO-2019003074 A1 | * | 1/2019 | | A61B 10/0051 |
| WO | WO-2020053706 A1 | * | 3/2020 | | A61B 5/0024 |

OTHER PUBLICATIONS

Max Freeman-Mills, "Apple AR Glasses Could Land In 2022—According to New Report," https://www.wareable.com/ar/apple-augmented-reality-ar-smartglasses-3501, Wareable Ltd., Nov. 12, 2019.

"Bluetooth," https://en.wikipedia.org/wiki/Bluetooth, Wikimedia Foundation, Inc., Oct. 14, 2020.

"Connectivity," https://developers.google.com/glass-enterprise/guides/connectivity, Google Developers, Glass Enterprise Edition 2, Jul. 27, 2020.

"Design Guidelines," https://developers.google.com/glass-enterprise/guides/design-guidelines, Glass Enterprise Edition 2, Google Developers, May 21, 2019.

"Development Tips," https://developers.google.com/glass-enterprise/guides/development-tips, Glass Enterprise Edition 2, Google Developers, Aug. 12, 2020.

"Get Started," https://developers.google.com/glass-enterprise/guides/get-started, Glass Enterprise Edition 2, Google Developers, Aug. 12, 2020.

"Inputs and Sensors," https://developers.google.com/glass-enterprise/guides/inputs-sensors, Google Developers, Glass Enterprise Edition 2, Jul. 29, 2020.

"Smartglasses," https://en.wikipedia.org/wiki/Smartglasses, Wikimedia Foundation, Inc., Oct. 1, 2020.

"Tech Specs," https://www.google.com/glass/tech-specs/, Glass Enterprise Edition 2, Retrieved on Oct. 19, 2020.

Michael Sawh, "The Best AR Glasses and Smartglasses 2020: Snap, Vuzix and More," https://www.wareable.com/ar/the-best-smartglasses-google-has-and-the-rest, Wareable Ltd., Jul. 1, 2020.

"User Interface," https://developers.google.com/glass-enterprise/guides/user-interface, Google Developers, Glass Enterprise Edition 2, Feb. 27, 2020.

"Vue Lite Cygnus," https://vueglasses.com/collections/eyeglasses-vue-life-cygnus-eyeglasses?variant=35797226291363, Vigo Technologies Inc., Retrieved on Oct. 19, 2020.

"Vue: Your Everyday Smart Glasses," https://www.kickstarter.com/projects/vue/vue-your-everyday-smart-glasses, Kickstarter, PBC, Retrieved on Oct. 19, 2020.

"Nano-Thin Flexible Touchscreens Could Be Printed Like Newspaper," https://www.sciencedaily.com/releases/2020/01/200124112927.htm, Science Daily, Jan. 24, 2020.

"Network Interface Controller," https://en.wikipedia.org/wiki/Network_interface_controller, Wikimedia Foundation, Inc., Jan. 11, 2021.

"Network Interface Card (NIC)," https://searchnetworking.techtarget.com/definition/network-interface-card, TechTarget, Retrieved on Feb. 4, 2021.

Junxuan et al., "Research on E-Payment Model," International Conference on E-Business and E-Government, 2010.

Seneviratne et al., "A Survey of Wearable Devices and Challenges," IEEE Communications Surveys & Tutorials, vol. 19, No. 4, pp. 2573-2620, 2017.

* cited by examiner

SMARTGLASSES-TO-SMARTGLASSES PAYMENT SYSTEMS

FIELD OF TECHNOLOGY

Aspects of the disclosure relate to smartglasses. Specifically, this disclosure relates to smartglasses communications.

BACKGROUND OF THE DISCLOSURE

Smartglasses have become more common in recent years. For the purposes of this disclosure, smartglasses may be understood to mean wearable glasses that include one or more internal processors.

Smartglasses are compact devices and usually stay with the user. Therefore, smartglasses are easily accessible. Because of the ease of access associated with smartglasses, it would be desirable to enable a smartglasses to communicate with another smartglasses.

It would be further desirable for such communication to obviate the need for associated mobile devices, desktop computers, laptop computers, card devices or any other devices.

It would be yet further desirable for the communication to include payment instructions.

It would be yet further desirable for the communication between smartglasses to enable a first smartglasses to transfer funds from an account associated with the first smartglasses to an account associated with a second smartglasses.

SUMMARY OF THE DISCLOSURE

Apparatus and methods for smartglasses-to-smartglasses transactions are provided. For the purposes of this disclosure, smartglasses may be understood to mean wearable glasses that include one or more internal processors. The one or more internal processors may include one or more microprocessors.

In addition to the processors, smartglasses may also include hardware components associated with conventional glasses. Such conventional components may include a frame and lenses.

Other components of smartglasses may include one or more displays, one or more cameras for capturing photographs and/or videos, one or more audio input devices, one or more audio output devices and/or one or more wired and/or wireless communication modules (e.g., Bluetooth®, Beacon®).

One or more software modules may execute on the processors. The one or more software modules may be stored in a memory located within the smartglasses. The one or more software modules may, in the alternative, be referred to as applications. The applications may enable the smartglasses to execute various tasks.

In addition to software modules, smartglasses may also include a display. In one embodiment, the smartglasses display may be physically configured to add data alongside what the wearer sees through the lenses. In some embodiments, the smartglasses display may display data as an at least partially transparent overlay on top the lenses. As such, the user may view, through the overlay, the physical objects that are normally seen through lenses. Such a smartglasses display may be known as an augmented realty smartglasses display.

Another component of smartglasses may include the ability for smartglasses to modify its optical properties, such as tint and prescription of the lenses. The optical properties modification may be executed at any given time. Smartglasses may change optical properties of the lenses by executing one or more software modules on the internal processors.

Smartglasses may also include one or more communication transceivers. The communication transceivers may be operable to communicate with external processors. The external processors may be included in a mobile device or any other suitable computing device.

The smartglasses device may include a contactless communication module. The contactless communication module may operate on the smartglasses processor. The contactless communication module may initiate communication with another smartglasses. In some embodiments, the contactless communication module may be an active near field communication ("NFC") reader. As such, the contactless communication module may communicate with another smartglasses using NFC technology.

The method may include generating a transaction initiation at a first smartglasses. The transaction initiation may be the start of a transaction. Such a transaction may be a transfer of funds transaction or any other suitable transaction. In some embodiments, the first smartglasses may request a transfer of funds from an account associated with the first smartglasses to an account associated with a second smartglasses. In certain embodiments, the first smartglasses may request a transfer of funds from an account associated with the second smartglasses to an account associated with the first smartglasses.

It should be appreciated that the first smartglasses may not have knowledge of an account number of the account associated with the second smartglasses. As such, the transaction initiation may trigger a transmission from the first smartglasses to the second smartglasses. The transmission may include a request for a second smartglasses telephone number.

The second smartglasses may respond to the transmission. The response may include the second smartglasses telephone number. The first smartglasses may transmit the second smartglasses telephone number to an entity. The entity may include a telephone number to account number resolver module. Such a telephone number to account number resolver module may identify an account number associated with a mobile telephone number. As such, the mobile telephone number to account number resolver module may identify an account number associated with the second smartglasses.

Once the account number associated with the second smartglasses is identified, the account number associated with the second smartglasses may be transmitted to the first smartglasses.

In some embodiments, the first smartglasses and/or the second smartglasses may maintain data in an internal storage location. When transactions between the first smartglasses and the second smartglasses have been executed, the first smartglasses and/or the second smartglasses may maintain data relating to the transaction in the internal storage location. The data may include the account number associated with the second smartglasses telephone number. As such, in the event the first smartglasses and the second smartglasses previously communicated, the first smartglasses may not communicate with the entity to determine the account number. Rather, the first smartglasses may locate the account number within the internal storage location.

Upon receipt and/or determination of the account number associated with the second smartglasses at the first smartglasses, the first smartglasses may request a transaction amount and a personal identification number ("PIN") from a user of the first smartglasses.

The transaction amount, PIN and/or any other suitable user input may be received at the first smartglasses, from the user, in a variety of ways. For example, the user input may be received from the user via touch gestures to one or more dynamic or static buttons on the first smartglasses.

The user input may also be received from the user via touch gestures to one or more portions of the frames of the first smartglasses. Touch gestures may include swiping, tapping and squeezing. Touch gestures may also include a pattern of any of the above-mentioned gestures.

The user input may also be received from air-based hand and/or body gestures. Air-based hand and/or body gestures may be performed by the user's hand or body without specifically touching the smartglasses.

Various sensors may be included in the smartglasses. These sensors may include an accelerometer, a gyroscope, a touch pad and any other suitable sensors. These sensors may sense the hand and/or air gestures.

Upon sensing the hand and/or air gestures, the sensor(s) and/or associated processors may translate the hand and/or air gestures into user input. The user input may be based on a user input structure. The user input structure may be a digital number pad. In some embodiments, the user input structure may be received from an external processor.

Upon receipt of the transaction amount and the PIN at the first smartglasses, the first smartglasses may generate a transaction request. The transaction request may include an account number associated with a first smartglasses telephone number, an account number associated with the second smartglasses telephone number, the transaction amount and the PIN.

The first smartglasses may transmit the transaction request to the entity. The entity may or may not be the same entity that is associated with the telephone number to account number resolver module. The entity may process the transaction request. The entity may transmit a transaction confirmation to the first smartglasses and/or the second smartglasses.

In some embodiments, the first smartglasses and/or the second smartglasses may authenticate the user before, during and/or after the transaction initiation and/or transaction generation. An authorization module, included in the first smartglasses and/or the second smartglasses, may authenticate the user of the smartglasses. The authentication may be executed at an authorization module included in the smartglasses. The authorization module may authenticate the user based on a group of detected user behavioral characteristics. The group of detected user behavioral characteristics may include gait, speed, voice detection, head movements and body movements. The authorization module may authenticate the user using any suitable authentication method.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Apparatus and methods for smartglasses-to-smartglasses payment systems is provided.

A smartglasses device may include a plurality of hardware components. The hardware components may include a glasses frame. The glasses frame may enable the smartglasses to rest on a wearer's face. The hardware components may also include glasses lenses. The glasses lenses may correct the vision of the wearer.

The hardware components may also include a microprocessor. The microprocessor may be operable to initiate a transaction.

The hardware components may also include a display. The display may display software displays. The microprocessor may instruct the display regarding the software displays.

The hardware components may also include a battery. The battery may power the display and/or the microprocessor.

The hardware components may also include a nano wireless network interface card ("NIC"). The nano wireless NIC may establish communication with a wireless network.

The hardware components may also include an active NFC reader. The active NFC reader may detect one or more other smartglasses device within a predetermined proximity to the smartglasses device. The active NFC reader may establish communication with the one or more other smartglasses device.

The smartglasses device may also include a plurality of software components.

The plurality of software components may include a digital number pad. The digital number pad may display numerical digital software selections to the user. The digital number pad may also receive numerical input from the user.

The plurality of software components may also include an information controller module. The information controller module may capture data via the digital number pad. The captured data may include a transaction amount and/or a PIN. As such, the received numerical input may correspond to the transaction amount and/or the PIN.

The plurality of software components may also include an NFC controller module. The NFC controller module may operate as the software for the active NFC reader. As such, the NFC controller module may activate NFC communication via the NFC reader.

The NFC controller module may also send and/or receive user data, payment data and/or authentication data. As such, the NFC controller module may receive the captured data from the information controller module. The captured data may include the transaction amount and/or the PIN. The NFC controller module may transmit the captured data to a wireless controller module.

The NFC controller module may communicate with the one or more other smartglasses devices. Therefore, the NFC controller module may communicate with a second smartglasses device. The second smartglasses device may be included in the one or more other smartglasses devices. The communication from the smartglasses device to the second smartglasses device may include a request for a second smartglasses mobile telephone number.

The NFC controller module may receive the second smartglasses mobile telephone number from the second smartglasses device.

The plurality of software components may also include the wireless controller module. The wireless controller module may interface between the nano wireless NIC and an external Wi-Fi device. The external Wi-Fi device may be included in the wireless network. The Wi-Fi device may be within sufficient proximity to the smartglasses device to communicate with the software and hardware components included in the Wi-Fi device.

The wireless controller module may also transmit the captured data to an external entity. The transmission of the captured data may be communicated over the wireless network.

The NFC controller module and/or the wireless controller module may include multiple modes. The modes may include discoverable mode and non-discoverable mode. In a discoverable mode, the smartglasses may be actively searching for other devices. In a non-discoverable mode, the smartglasses may not be actively searching for devices.

The plurality of software components may also include a telephone number to account number resolver module. In such embodiments, the telephone number to account number resolver module may be internal to the smartglasses device. The telephone number to account number resolver module may receive a telephone number from the NFC controller module.

The telephone number to account number resolver module may communicate with the external entity and/or internal storage location to identify an account number associated with a received telephone number. The telephone number may be a mobile telephone number.

The mobile telephone number may be associated with one or the one or more other smartglasses devices. The mobile telephone number may be associated with the second smartglasses device. As such, the telephone number to account number resolver module may identify an account number associated with the mobile telephone number associated with the second smartglasses device.

In some embodiments, the smartglasses device may be associated with multiple mobile telephone numbers. The multiple mobile telephone numbers may be stored in a storage location included in the smartglasses device. The smartglasses device may also be associated with multiple account numbers. In certain embodiments, each telephone number may be associated with an account number. As such, in order to generate a transaction, the wearer of the smartglasses may select a telephone number. The telephone number to account number resolver module may identify the account number associated with the selected telephone number. As such, the telephone number to account number resolver module may identify the account number associated with the smartglasses device.

The plurality of software components may also include an amount and PIN verification module. The amount and PIN verification module may verify the transaction amount and/or the PIN with the external entity.

As stated above, the microprocessor, included in the smartglasses device, may initiate a transaction. The microprocessor may generate a transaction request. The transaction request may be a transfer of funds instruction. A benefactor account of the transaction request may be the account associated with the first smartglasses telephone number. A beneficiary account of the transaction request may be the account associated with the second smartglasses mobile telephone number.

The transaction request may include an account number associated with the initiating smartglasses device. The transaction request may include the transaction amount. The transaction request may include the PIN. The transaction request may include the smartglasses account number associated with the second smartglasses mobile telephone number.

The microprocessor may transmit the generated transaction request to the entity. The entity may process the transaction request.

Upon completion of processing the transaction request at the entity, the entity may transmit a confirmation to the smartglasses device and/or to the second smartglasses device. The confirmation(s) may notify regarding the completion of the transaction request processing.

The confirmations may also include details relating to the transaction. Such details may include one or more account numbers and/or a portion of one or more account numbers. Such details may also include a transaction amount. Such details may also include a date-time stamp.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
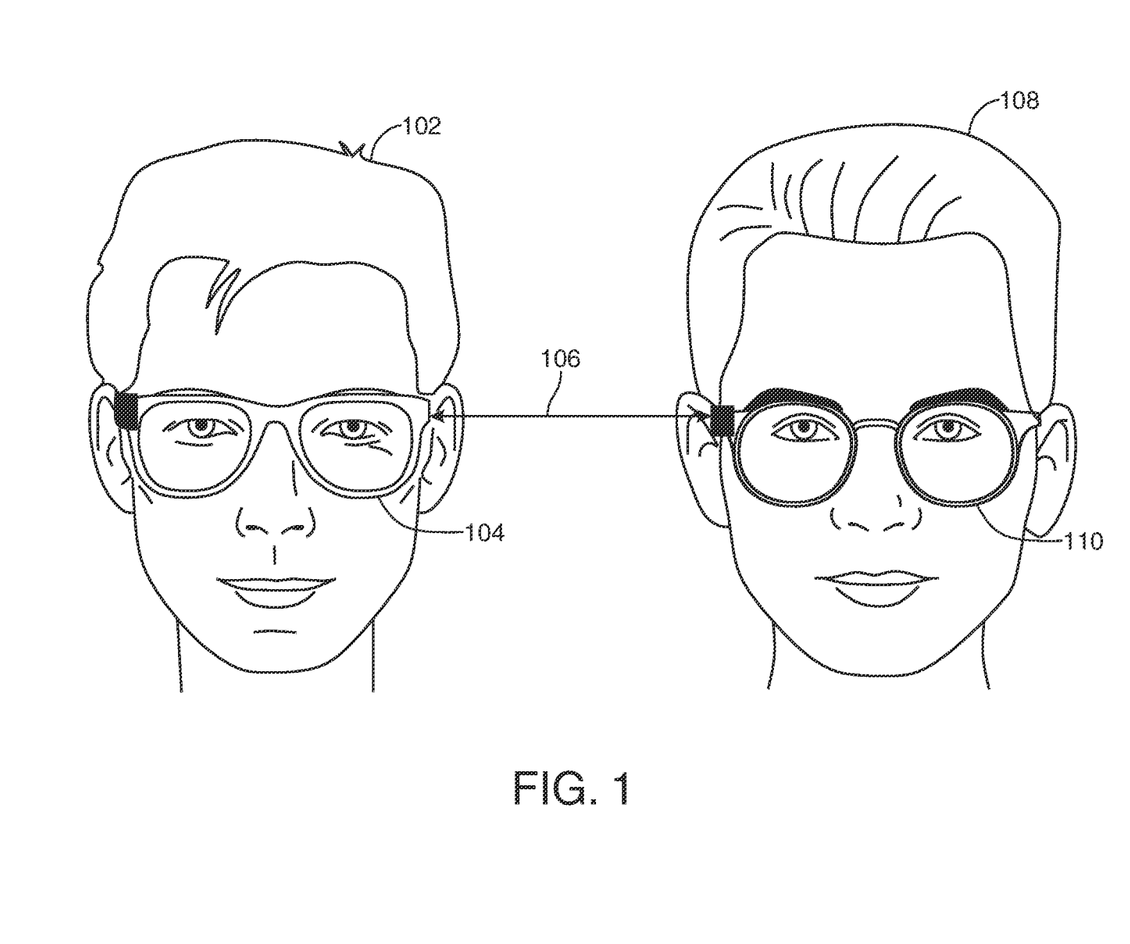
FIG. 1 shows an illustrative diagram in accordance with principles of the disclosure.

FIG. 1 shows an illustrative diagram. The illustrative diagram shows smartglasses-to-smartglasses communication. Smartglasses 104 may be worn by user 102. Smartglasses 110 may be worn by user 108. Smartglasses 104 and 110 may include capabilities such as those described above. Smartglasses 104 and smartglasses 110 may communicate with each other, as shown at communication 106.

Figure 2:
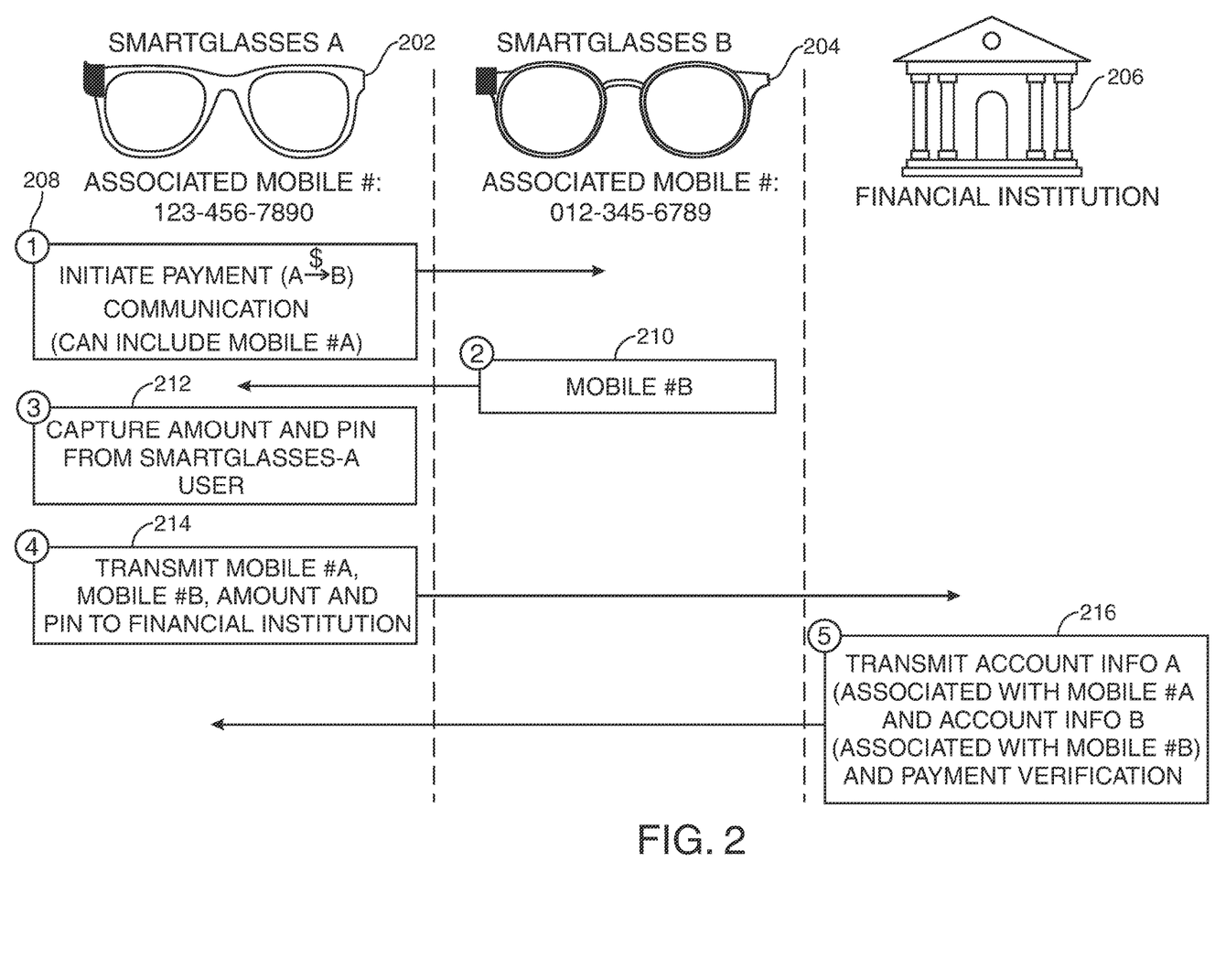
FIG. 2 shows another illustrative diagram in accordance with principles of the disclosure.

FIG. 2 shows an illustrative diagram. The illustrative diagram shows communication between a first smartglasses (smartglasses A), shown at 202, a second smartglasses (smartglasses B), shown at 204 and a financial institution, shown at 206.

Smartglasses A may be associated with mobile telephone number 123-456-7890. Smartglasses B may be associated with mobile telephone number 012-345-6789.

Step 1 of an exemplary communication is shown at 208. Step 1 may include initiation of a payment communication. The payment communication may be transmitted from smartglasses A to smartglasses B.

The payment communication may include a transfer of funds instruction. The intent of the transfer of funds instruction may be to transfer funds from an account associated with smartglasses A to an account associated with smartglasses B. Each account may be linked to its respective smartglasses via the associated mobile telephone number. The payment communication that is transferred from smartglasses A to smartglasses B may include the mobile telephone number associated with smartglasses A.

Step 2 of the exemplary communication is shown at 210. In response to receiving the payment communication, smartglasses B may transmit its associated mobile telephone number to smartglasses A.

Step 3 of the exemplary communication is shown at 212. A user of smartglasses A may enter a transaction amount and a PIN. As such, the transaction amount and PIN may be captured at smartglasses A.

Step 4 of the exemplary communication is shown at 214. Smartglasses A may transmit mobile telephone number A, mobile telephone number B, transaction amount and PIN to financial institution 206.

Step 5 of the exemplary communication is shown at 216. Financial institution 206 may transmit account information A, which is associated with mobile telephone number 123-456-7890, account information B, which is associated with mobile telephone number 012-345-6789 and a payment verification to smartglasses A.

In some embodiments, smartglasses A may respond to the payment verification with an approval. Upon receipt of the approval, financial institution 206 may process the payment.

Figure 3:
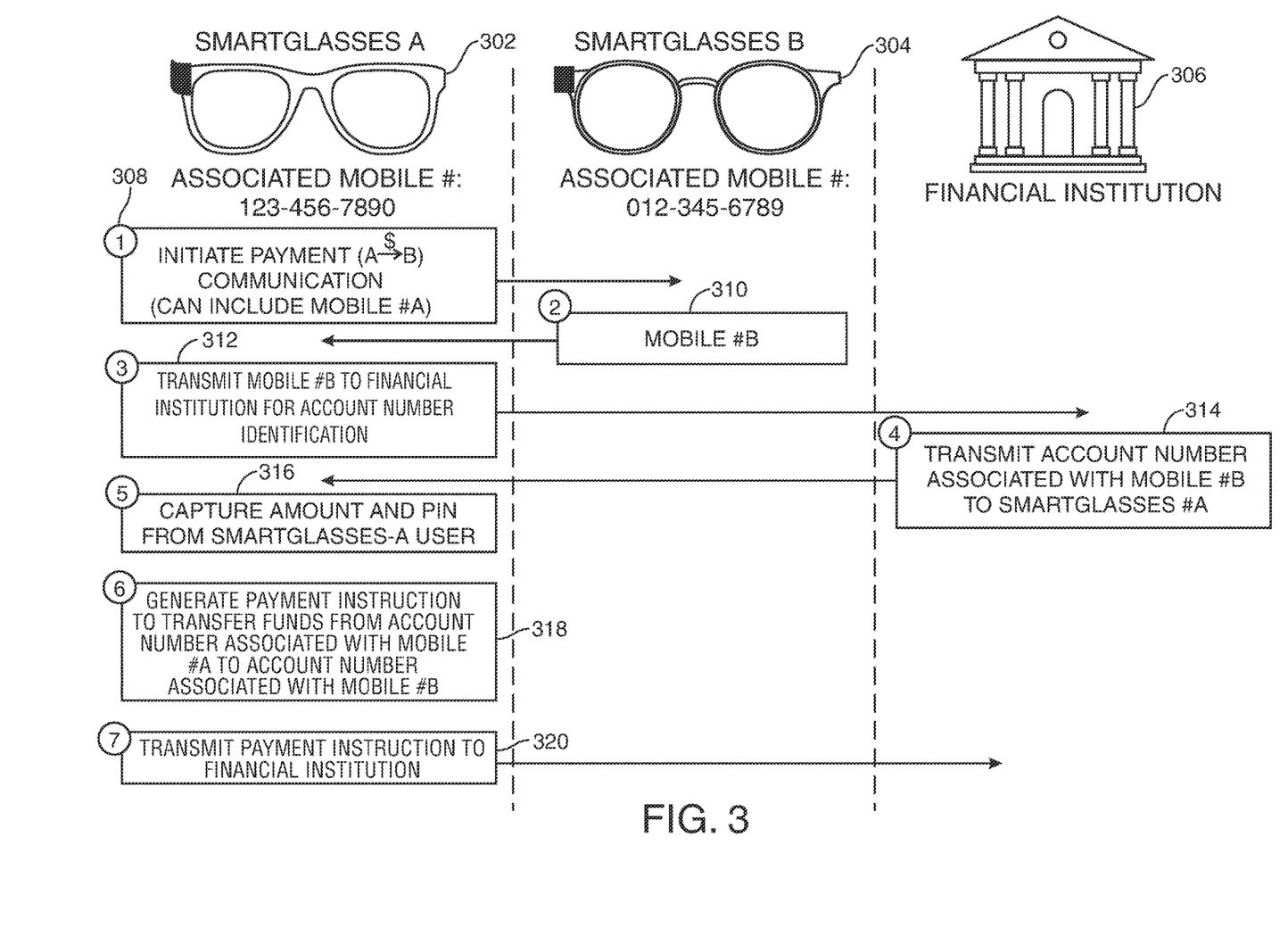
FIG. 3 shows yet another illustrative diagram in accordance with principles of the disclosure.

FIG. 3 shows an illustrative diagram. The illustrative diagram shows communication between a first smartglasses (smartglasses A), shown at 302, a second smartglasses (smartglasses B), shown at 304 and a financial institution, shown at 306.

Smartglasses A may be associated with mobile telephone number 123-456-7890. Smartglasses B may be associated with mobile telephone number 012-345-6789.

Step 1 of an exemplary communication is shown at 308. Step 1 may include initiation of a payment communication. The payment communication may be transmitted from smartglasses A to smartglasses B.

The payment communication may include a transfer of funds instruction. The intent of the transfer of funds instruction may be to transfer funds from an account associated with smartglasses A to an account associated with smartglasses B. Each account may be linked to its respective smartglasses via the associated mobile telephone number. The payment communication that is transferred from smartglasses A to smartglasses B may include the mobile telephone number associated with smartglasses A.

Step 2 of the exemplary communication is shown at 310. In response to receiving the payment communication, smartglasses B may transmit its associated mobile telephone number to smartglasses A.

Step 3 of the exemplary communication is shown at 312. Smartglasses A may transmit mobile telephone number associated with smartglasses B to financial institution 306 for account number identification.

Step 4 of the exemplary communication is shown at 314. Financial institution 306 may identify an account number associated with the mobile telephone number associated with smartglasses B. Financial institution 306 may transmit the identified account number to smartglasses A.

Step 5 of the exemplary communication is shown at 316. Smartglasses A may capture an amount and PIN from the user of smartglasses A.

Step 6 of the exemplary communication is shown at 318. Smartglasses A may generate a payment instruction to transfer funds from the account number associated with smartglasses A to the account number associated with smartglasses B.

Step 7 of the exemplary communication is shown at 320. Smartglasses A may transmit a payment instruction to financial institution 306 for processing. It should be appreciated that financial institution 306 may be associated with the account associated with smartglasses A and/or the account associated with smartglasses B. In the event that financial institution 306 is associated with the account associated with smartglasses A, financial institution 306 may communicate with a second financial institution associated with the account associated with smartglasses B.

Figure 4:
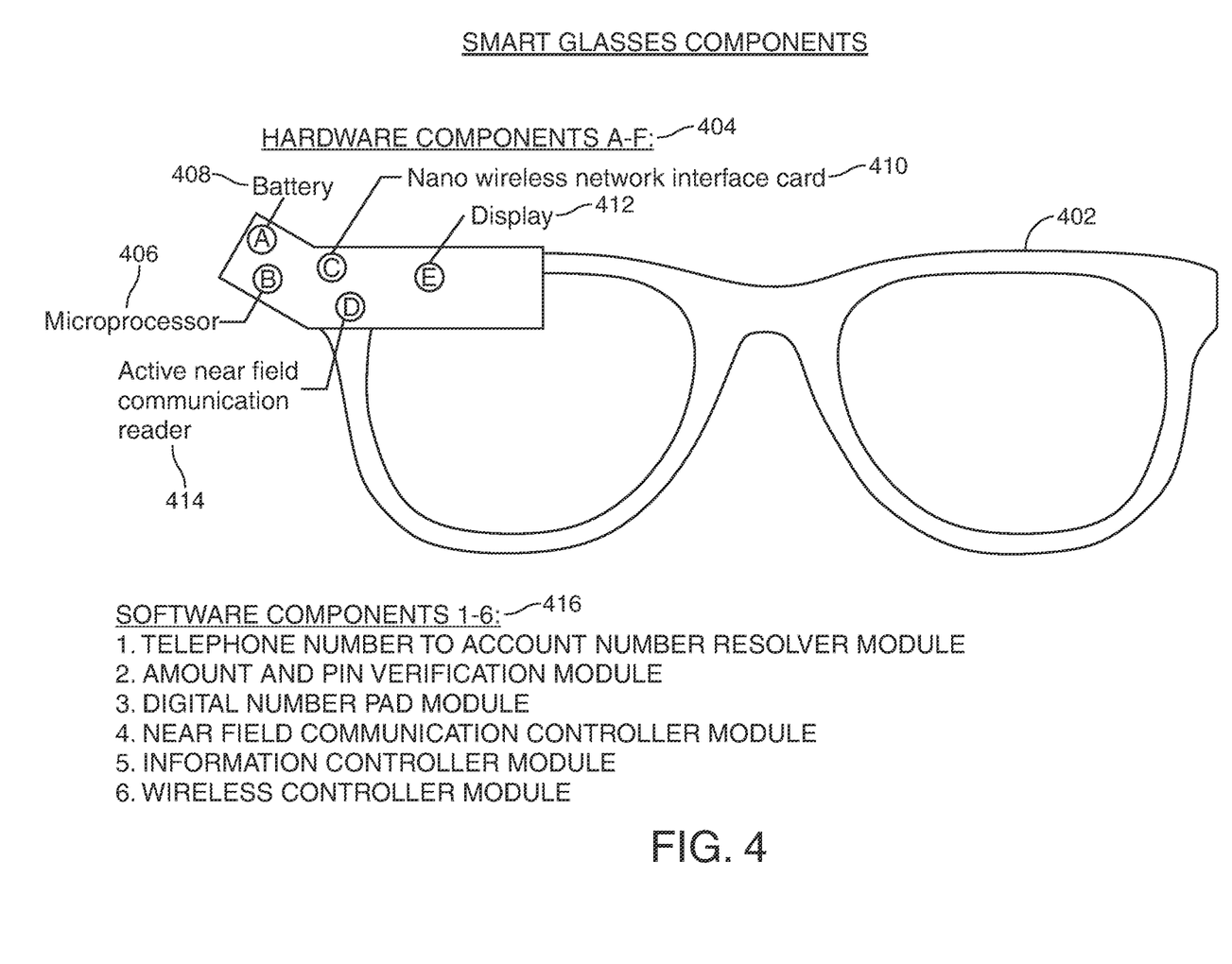
FIG. 4 shows still another illustrative diagram in accordance with principles of the disclosure.

FIG. 4 shows an exemplary diagram. The exemplary diagram includes components of smartglasses 402. The components may include two sets of components, hardware components, shown at 404 and software components, shown at 416.

Hardware components may include component A, a battery, shown at 408. The battery may power other components of the smartglasses, such as the display and the microprocessor.

Hardware components may include component B, a microprocessor, shown at 406. The microprocessor may execute the processes within the smartglasses. The microprocessor may also initiate transactions.

Hardware components may include component C, shown at 410, a nano wireless NIC. The nano wireless NIC may establish communication between the smartglasses and a nearby wireless network. The wireless network may enable the smartglasses to communicate with a financial institution.

Hardware components may include component D, shown at 414, an active NFC reader. The active NFC reader may detect the proximity of other smartglasses. The active NFC reader may establish communication between the smartglasses and the other smartglasses.

Hardware components may include component E, shown at 412, a display. The display may display software-based displays to the user.

Software components may include a telephone number to account number resolver module. The telephone number to account number resolver module may communicate with the financial institution to identify an account number associated with a telephone number.

Software components may include an amount and PIN verification module. The amount and PIN verification module may verify the amount of the transaction and the PIN with the financial institution.

Software components may include a digital number pad module. The digital number pad module may display a digital number pad to the smartglasses user.

Software components may include an NFC controller module. The NFC controller module may activate NFC with the active NFC reader. The NFC controller module may send and/or receive user data, payment data and/or authentication data.

Software components may include an information controller module. The information controller module may capture amount and PIN information from the user.

Software components may include a wireless controller module. The wireless controller module may interface between the nano wireless NIC and an external Wi-Fi device.

Figure 5:
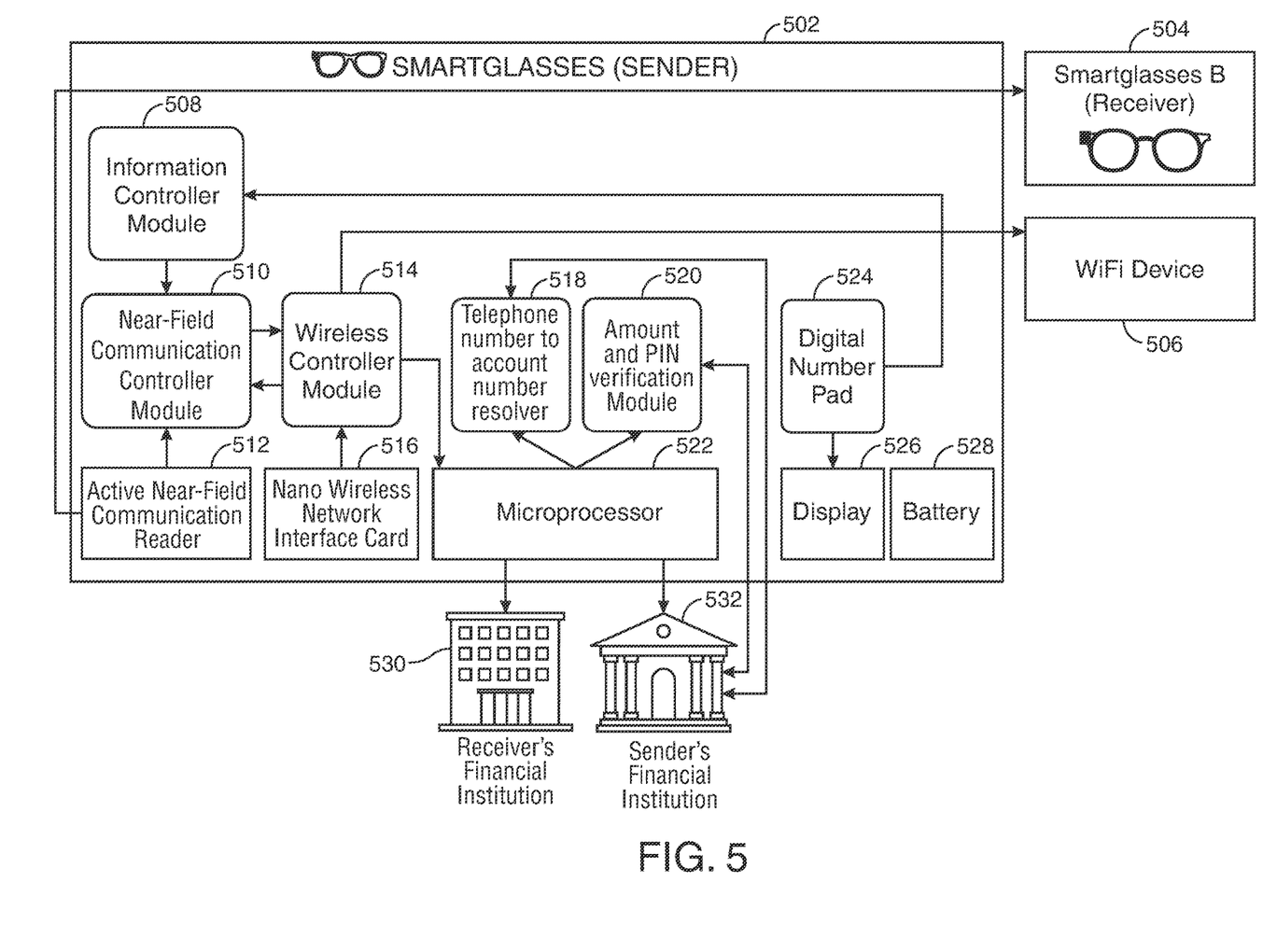
FIG. 5 shows still yet another illustrative diagram in accordance with principles of the disclosure.

FIG. 5 shows a payment system where funds can be transferred from an account associated with a first smartglasses (502) to an account associated with a second smartglasses (504).

Smartglasses 502 may include microprocessor 522. Battery 528 may power microprocessor 522. Microprocessor 522 may initiate a transaction.

Smartglasses 502 may also include digital number pad 524. Digital number pad 524 may be displayed on display 526. Digital number 524 pad may receive numerical user input.

Smartglasses may also include nano wireless NIC card 516. Nano wireless NIC card 516 may be responsible for establishing communication with a nearby wireless network.

Smartglasses may also include an active NFC reader 512. NFC reader 512 may detect smartglasses in a predetermined vicinity. NFC reader 512 may establish communication with the detected smartglasses, such as smartglasses 504.

Smartglasses 502 may also include a telephone number to account number resolver 518. Telephone number to account number resolver 518 may identify financial institution account information associated with a telephone number.

Telephone number to account number resolver 518 may communicate with an entity, such as financial institution. The financial institution may store account information. The financial institution may process transactions.

Smartglasses 502 may also include an amount and PIN verification module 520. Amount and PIN verification module 520 may capture user input relating to an amount and a PIN. Amount and PIN verification module 520 may capture the hand-gesture-based user input.

Active NFC reader 512 may communicate with NFC controller 510. NFC controller 510 may activate NFC communication. NFC controller 510 may send and receive a user's payment and authentication data.

Smartglasses 502 may also include information controller 508. Information controller 508 may communicate with amount and PIN verification module 520. Information controller 508 may capture amount and PIN information. Information controller 508 may transfer the captured amount and PIN information to NFC controller 510.

NFC controller 510 and nano wireless NIC card 516 may communicate with wireless controller 514. Wireless controller 514 may communicate with external Wi-Fi device 506.

Wireless controller 514 may communicate with microprocessor 522. Microprocessor 522 may communicate with a receiver's financial institution 530 and a sender's financial institution 532.

Thus, smartglasses-to-smartglasses payment systems are provided. Persons skilled in the art will appreciate that the present invention can be practiced by other than the described embodiments, which are presented for purposes of illustration rather than of limitation. The present invention is limited only by the claims that follow.

What is claimed is:

1. A smartglasses device comprising:
   a plurality of hardware components comprising:
   a microprocessor, said microprocessor operable to initiate a transaction;
   a memory having stored thereon a plurality of software components, the plurality of software components comprising:
   a digital number pad;
   an information controller module;
   a near field communication ("NFC") controller module;
   a wireless controller module;
   a telephone number to account number resolver module; and
   an amount and personal identification number ("PIN") verification module;
   a display, said display operable to display software displays as instructed by the microprocessor;
   a battery, said battery operable to power the display and the microprocessor;
   a nano wireless network interface card, said nano wireless network interface card for establishing communication with a wireless network; and
   an active NFC reader, said active NFC reader operable to:
   detect one or more other smartglasses devices within a predetermined proximity to the smartglasses device; and
   establish communication with the one or more other smartglasses devices;
   wherein the microprocessor, upon execution of the plurality of software components, is further operable to:
   display, via the digital number pad, numerical digital software selections to a user;
   receive, via the digital number pad, numerical input of a transaction amount and a PIN from the user;
   capture, via the information controller module from the digital number pad:
   the transaction amount; and
   the PIN;
   activate, via the NFC controller module, NFC communication via the active NFC reader;
   communicate, via the NFC controller module, with a second smartglasses device, the communication with the second smartglasses device comprising a request for a second smartglasses mobile telephone number;
   receive, via the NFC controller module, the second smartglasses mobile telephone number from the second smartglasses device;
   communicate, via the NFC controller module, the second smartglasses mobile telephone number to the telephone number to account number resolver module;
   receive, via the NFC controller module, from the information controller module:
   the transaction amount; and
   the PIN;
   transmit, via the NFC controller module, to a wireless controller module:
   the transaction amount; and
   the PIN;
   interface, via the wireless controller module, between the nano wireless network interface card and an external Wi-Fi device, said external Wi-Fi device included in the wireless network;
   transmit, via the wireless controller module over the wireless network, the transaction amount and the PIN to an external entity;
   communicate, via the telephone number to account number resolver module, with the external entity and/or an internal storage location to identify an account number associated with the second smartglasses mobile telephone number; and
   verify, via the amount and PIN verification module, the transaction amount and the PIN with the external entity.

2. The smartglasses device of claim 1, wherein the external Wi-Fi device is within proximity to the smartglasses device to communicate with the smartglasses device.

3. The smartglasses device of claim 1, wherein the microprocessor is further operable to:

generate a transaction request, said transaction comprising an account number associated with the smartglasses device, the transaction amount, the PIN and the account number associated with the second smartglasses mobile telephone number; and transmit the generated transaction request to the external entity.

4. The smartglasses device of claim 3, wherein the transaction request is a transfer of funds instruction.

5. The smartglasses device of claim 4, wherein a benefactor account of the transaction request is an account number associated with the smartglasses device.

6. The smartglasses device of claim 4, wherein a beneficiary account of the transaction request is the account number associated with the second smartglasses mobile telephone number.

7. The smartglasses device of claim 3, wherein, upon completion of the transaction request at the external entity, the external entity transmits confirmation of completion of the transaction request to the smartglasses device and the second smartglasses device.

\* \* \* \* \*